US007512582B2

(12) United States Patent
Cao et al.

(10) Patent No.: US 7,512,582 B2
(45) Date of Patent: Mar. 31, 2009

(54) UNCERTAINTY REDUCTION IN COLLABORATIVE BOOTSTRAPPING

(75) Inventors: Yunbo Cao, Beijing (CN); Hang Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 322 days.

(21) Appl. No.: 10/732,741

(22) Filed: Dec. 10, 2003

(65) Prior Publication Data

US 2005/0131850 A1     Jun. 16, 2005

(51) Int. Cl.
*G06F 9/44*     (2006.01)
*G06F 17/00*     (2006.01)
*G06N 7/02*     (2006.01)
*G06N 7/06*     (2006.01)

(52) U.S. Cl. ............................. 706/55; 706/52; 706/59
(58) Field of Classification Search .................... 706/1, 706/15, 45, 14, 50, 20; 700/1, 90; 705/10; 386/1, 46; 707/5, 1
See application file for complete search history.

(56) References Cited

U.S. PATENT DOCUMENTS

2003/0144899 A1*    7/2003    Kokubo ....................... 705/10

OTHER PUBLICATIONS

'Formalizing Spider Diagrams': Joseph Gil, John Howse, Stuart Kent, Sep. 13-16, 1999, IEEE, Visual Languages 1999 Proceedings IEEE symposium on Sep. 13-16, 1999, pp. 130-137.*

'A Sequential Algorithm for Training Text Classifiers', David D Lewis, William A GaleJul. 1994, ACM SIGIR, Proceedings of the 17th Annual International ACM SIGIR Conference on Research and Development in Information Retrieval, pp. 3-12.*
'Word Translation Disambiguation Using Bilingual Bootstrapping', Cong Li, Hang Li, Jul. 2002, Proceedings of the 40th Annual Meeting of the Association for Computational Linguistics (ACL) pp. 343-351.*
'Formalizing Spider Diagrams': Joseph Gil, John Howse, Stuart Kent, Aug 27, 1999, pp. 1-8.*
'Uncertainty Reduction in Collaborative Bootstrapping: Measure and Algorithm': Yubo Cao, Hang Li, Li Lian, May 14, 2003, pp. 1-8.*
'Chinese-English Bilingual speech recognition': Yu, Oct. 2003, IEEE, 0-7803-7902-0, pp. 603-609.*
'A Bootstrapping Method for Extracting Bilingual Text Pairs': Masuichi, 2000, ACM, 10.3115/992730.992806, pp. 1066-1070.*
Steven Abney. Bootstrapping. ACL 2002 40th Annual Meeting of the Association for Computational Linguistics: Proceedings of the Conference. 2002, p. 360-367.
A. Blum and T. Mitchell. 1998. Combining Labeled and Unlabeled Data with Co-Training. In *Proceedings of 11th Annual Conference On Computational Learning Theory (COLT)*, pp. 92-100.

(Continued)

*Primary Examiner*—David R Vincent
*Assistant Examiner*—Peter Coughlan
(74) *Attorney, Agent, or Firm*—Westman, Champlin & Kelly, P.A.

(57) ABSTRACT

Collaborative bootstrapping with uncertainty reduction for increased classifier performance. One classifier selects a portion of data that is uncertain with respect to the classifier and a second classifier labels the portion. Uncertainty reduction includes parallel processing where the second classifier also selects an uncertain portion for the first classifier to label. Uncertainty reduction can be incorporated into existing or new co-training or bootstrapping, including bilingual bootstrapping.

16 Claims, 6 Drawing Sheets

OTHER PUBLICATIONS

Micheal Collins and Yoram Singer. 1999. Unsupervised Models for Named Entity Classification. In *Proceedings of the 1999 Joint SIGDAT Conference on Empirical Methods in Natural Language Processing and Very Large Corpora*; pp. 100-110.

S. Dasgupta, M. Littman and D. McAllester. 2002. PAC Generalization Bounds for Co-Training. In *Advances in Neutral Information Processing Systems*, vol. 1. pp. 375-382.

T. Joachims. 1997. A Probabilistic Analysis of the Rocchio Algorithm with TFIDF for Text Categorization. In *Proceedings of the 14th International Conference on Machine Learning*. pp. 143-151.

D. Lewis and W. Gale. 1994. A Sequential Algorithm for Training Text Classifiers. In *Proceedings of the 17th Annual International ACM SIGIR Conference on Research and Development in Information Retrieval*. pp. 3-12.

Cong Li and Hang Li. 2002. Word Translation Disambiguation Using Bilingual Bootstrapping. In *Proceedings of the 40th Annual Meeting of the Association for Computational Linguistics*. pp. 343-351.

K. Nigam and R. Ghani. 2000. Analyzing the Effectiveness and Applicability of Co-Training. In *Proceedings of the 9th International Conference on Information and Knowledge Management*. pp. 86-93.

* cited by examiner

UNCERTAINTY REDUCTION IN COLLABORATIVE BOOTSTRAPPING

BACKGROUND OF THE INVENTION

The present invention relates to classifier training systems. In particular, the present invention relates to uncertainty reduction in collaborative bootstrapping.

Collaborative bootstrapping systems include both co-training and bilingual bootstrapping. Generally, collaborative bootstrapping is iterative and begins with a small number of labeled data and a large number of unlabeled data. Two classifiers or types of classifiers are trained from the labeled data. The two classifiers label some unlabeled data and then train two new classifiers from all the labeled data. The process then repeats. During the process, the two classifiers collaborate with each other by exchanging labeled data. Generally, in co-training, the two classifiers have different feature structures, and in bilingual bootstrapping, the two classifiers have different class structures.

Under co-training, which was developed by Blum and Mitchell (1998), two classifiers were constructed in parallel and used to identify a topic for a web page. One classifier used text segments from a web page to classify the web page and another classifier used anchor texts linking to the web page to classify the web page. The topics identified or labeled for the web pages by the classifiers were then used to retrain the classifiers. Other types of co-training were developed by Collins and Singer (1999) and Nigram and Ghani (2000). Under bilingual bootstrapping, which was developed by Li and Li (2002), two classifiers were constructed in parallel, exchanged information with one another, and used to disambiguate words that had two possible translations in another language.

In certain situations, the classifiers in conventional collaborative bootstrapping are unable to boost their classification performance while bootstrapping more labeled data. Therefore, a system and/or method to address this problem would enhance the performance or accuracy of classifiers.

SUMMARY OF THE INVENTION

In the present inventions, uncertainty reduction has been discovered to be an important technique for improving performance of classification including collaborative bootstrapping. Collaborative bootstrapping includes techniques such as co-training and bilingual bootstrapping where the classifiers reduce uncertainty by exchanging labeled data.

Aspects of the present invention include a method of training a classifier to classify data that includes two classifiers. The two classifiers reduce uncertainty with respect to each other. In other aspects, an algorithm or method relating to collaborative bootstrapping with uncertainty reduction is provided, which can improve the performance of existing collaborative bootstrapping algorithms. Generally, one classifier can ask the other classifier to label the uncertain instances of the first classifier. Experimental results verify that the present method outperforms existing methods, significantly in some cases. In still other aspects, an uncertainty measure that represents the degree of uncertainty correlation of the two classifiers is provided. This uncertainty correlation coefficient or "UCC" can be used to analyze classifier performance and/or accuracy.

DETAILED DESCRIPTION OF ILLUSTRATIVE EMBODIMENTS

Figure 1:
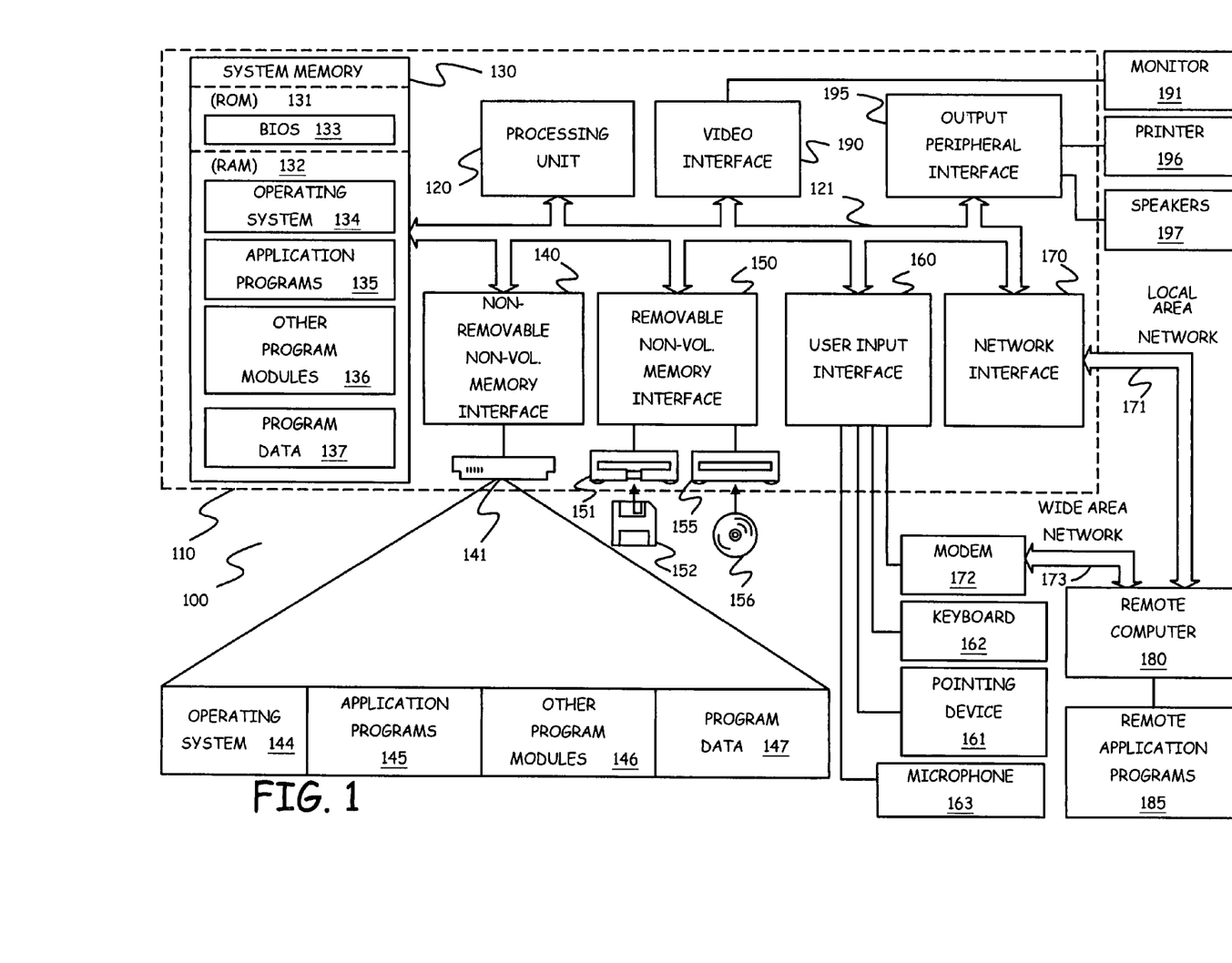
FIG. 1 is a block diagram of a general computing environment in which the present invention may be practiced.

Before addressing detailed aspects of the present invention, it may be helpful to describe generally computing devices that can be used for practicing the invention. FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCS, minicomputers, mainframe computers, telephone systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. Tasks performed by the programs and modules are described below and with the aid of figures. Those skilled in the art can implement the description and/or figures herein as computer-executable instructions, which can be embodied on any form of computer readable media discussed below.

The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of computer 110. Components of computer 110 may include, but are not limited to, processing unit 120, system memory 130, and system bus 121 that couples various system components including the system memory to processing unit 120. System bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standard Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

System memory 130 includes computer storage media in the form of volatile and/or non-volatile memory such as read only memory (ROM) 131 and random access memory (RAM) 132. Basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 can also include other removable/non-removable, and volatile/non-volatile computer storage media. By way of example only, FIG. 1 illustrates hard disk drive 141 that reads from or writes to non-removable, non-volatile magnetic media, magnetic disk drive 151 that reads from or writes to removable, non-volatile magnetic disk 152, and optical disk drive 155 that reads from or writes to removable, non-volatile optical disk 156 such as a CD ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. Hard disk drive 141 is typically connected to system bus 121 through a non-removable memory interface such as interface 140, and magnetic disk drive 151 and optical disk drive 155 are typically connected to system bus 121 by a removable memory interface, such as interface 150.

The drives and their associated computer storage media discussed above and illustrated in FIG. 1, provide storage of computer readable instructions, data structures, program modules and other data for computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into computer 110 through input devices such as keyboard 162, microphone 163, and/or pointing device 161, such as a mouse, trackball or touch pad. Other input devices (not shown) may include a joystick, game pad, satellite dish, scanner, or the like. These and other input devices are often connected to processing unit 120 through user input interface 160 that is coupled to the system bus, but may be connected by other interface and bus structure, such as a parallel port, game port or a universal serial bus (USB). Monitor 191 or other type of display device is also connected to system bus 121 via an interface, such as a video interface 190. In addition to the monitor, computers may also include other peripheral output devices such as speakers 197 and printer 196, which may be connected through output peripheral interface 190.

Computer 110 may operate in a networked environment using logical connections to one or more remote computers, such as remote computer 180. Remote computer 180 may be a personal computer, a hand-held device, a server, a router, a network PC, a peer device or other common network node, and typically includes many or all of the elements described above relative to computer 110. The logical connections depicted in FIG. 1 include local area network (LAN) 171 and wide area network (WAN) 173, but may also include other networks. Such networking environments are commonplace in offices, enterprise-wide computer networks, intranets and the Internet.

When used in a LAN networking environment, computer 110 is connected to LAN 171 through a network interface or adapter 170. When used in a WAN networking environment, computer 110 typically includes modem 172 or other means for establishing communications over WAN 173, such as the Internet. Modem 172, which may be internal or external, may be connected to system bus 121 via the user input interface 160, or other appropriate mechanism. In a networked environment, program modules depicted relative to computer 110, or portions thereof, may be stored in a remote memory storage device. By way of example, and not limitation, FIG. 1 illustrates remote application programs 185 as residing on remote computer 180. It will be appreciated that the network connections shown are exemplary and other means of establishing a communications link between the computers may be used.

In co-training, two parallel training processes collaborate with each other. More specifically, co-training uses labeled and unlabeled data to iteratively or repeatedly train two classifiers. The two classifiers are initially trained on labeled data. Some unlabelled data is labeled with the two classifiers and then exchanged between the two classifiers. The process then repeats.

In one approach, the two classifiers are assumed to be based on two subsets of the entire feature set and the two subsets are conditionally independent with one another given a class. This assumption is referred to as view independence. In this approach, a co-training algorithm includes one classifier asking the other classifier to label the most certain instances for the collaborator, which is described in detail in "Combining Labeled Data and Unlabeled data with Co-training," Blum, A. and Mitchell, T., In Proceedings of the 11$^{th}$ Annual Conference on Computational Learning Theory, 1998, herein incorporated by reference. Co-training was extended to artificial data classification as described in "Analyzing the Effectiveness and Applicability of Co-training," Nigam, K. and Ghani, R., In proceedings of the 9$^{th}$ International Conference on Information and Knowledge Management, 2000, herein incorporated by reference.

Bilingual Bootstrapping can be viewed as a kind of collaborative bootstrapping. Investigators have proposed the algorithm for word translation disambiguation between two languages, which is described in "Word Translation Disambiguation Using Bilingual Bootstrapping," Li, C. and Li., H, In proceedings of the 40$^{th}$ Annual Meeting of the Association for Computational Linguistics, 2002, herein incorporated by reference in its entirety. Bilingual bootstrapping is different from co-training. For instance, bilingual bootstrapping makes an assumption on the classes rather than the features as in co-training. Specifically, it is assumed that the classes of the classifiers in bilingual bootstrapping do not overlap.

Active learning is a learning paradigm. Instead of passively using all the given labeled instances for training as in supervised learning, active learning repeatedly asks a supervisor to label what it considers as the most critical instances and performs training with the labeled instances. Thus, active learning can eventually create a reliable classifier with fewer labeled instances than supervised learning. One strategy to select critical instances is called uncertainty reduction described in Lewis and Gale, 1994). Under the strategy, the most uncertain instances to the current classifier are selected and asked to be labeled by a supervisor. However, it is believed that uncertainty reduction has not been used for collaborative bootstrapping and is discussed below.

Labeling or assigning data to classes can be explained as follows: Let X denote a set of instances x or feature vectors and let Y denote a set of labels or classes y. Given a number of labeled instances, a function h:X→Y is constructed, which is referred to as a "classifier." Collaborative bootstrapping can use partial functions, $h_1$ and $h_2$, which either output a class label or output "no decision" denoted as "ND". As before, collaborative bootstrapping includes both co-training and bilingual bootstrapping.

In co-training, the two collaborating classifiers are assumed to be based on two different views, namely two different subsets of the entire feature set. In other words, view independence is assumed. In reality, however, it is generally difficult to find situations where view independence holds completely. Formally, the two views are respectively interpreted as two functions $X_1(x)$ and $X_2(x), x \in X$. Thus, the two collaborating classifiers, $h_1$ and $h_2$, can be respectively represented as $h_1(X_1(x))$ and $h_2(X_2(x))$.

Figure 8:
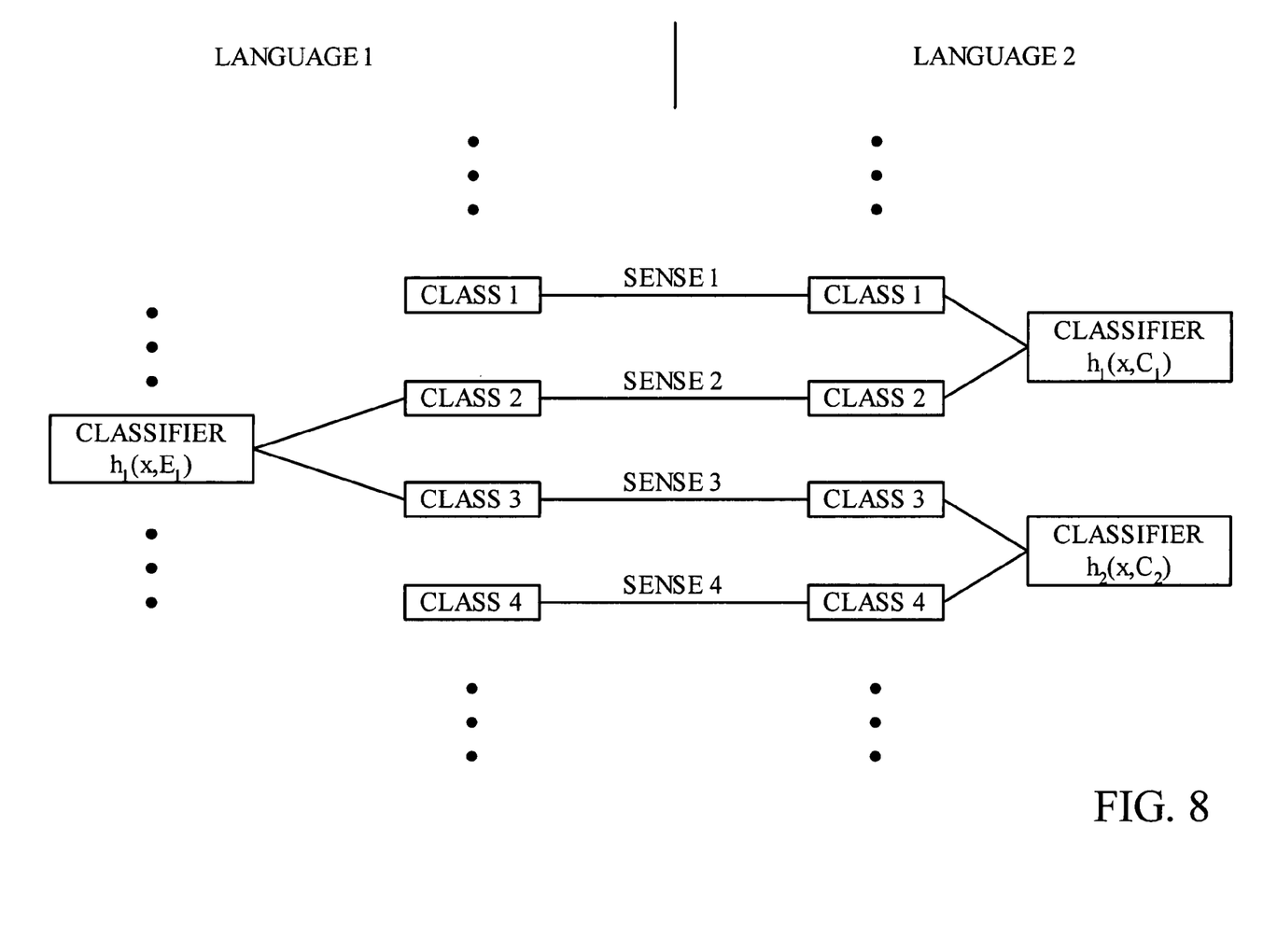
FIG. 8 illustrates an aspect of bilingual bootstrapping.

In bilingual bootstrapping, a number of classifiers are created in two languages. The classes of the classifiers correspond to word senses and do not overlap as shown in FIG. 8. The classifier $h_1(x|E_1)$ in language 1 or first language takes sense 2 and sense 3 as classes. The classifier $h_2(x|C_1)$ in language 2 or a second language takes sense 1 and sense 2 as classes. The classifier $h_2(x|C_2)$ also in language 2 takes sense 3 and sense 4 as classes. Different words in the two languages, such as English and Chinese, are denoted, for example, as $E_1$ and $C_1$ and $C_2$, respectively. Collaborative bootstrapping can be performed between the classifiers $h_1(*)$ in language 1 and the classifiers $h_2(*)$ in language 2 as described in Li and Li (2002) above.

For the classifier $h_1(x|E_1)$ in language 1, it is assumed that there is a pseudo classifier $h_2(x|C_1,C_2)$ in language 2, which functions as a collaborator of $h_1(x|E_1)$. The "pseudo" classifier $h_2(x|C_1,C_2)$ is based on $h_2(x|C_1)$ and $h_2(x|C_2)$ and takes or uses sense 2 and sense 3 as classes. Formally, two collaborating classifiers (one real classifier and one pseudo classifier) in bilingual bootstrapping are respectively represented as $h_1(x|E)$ and $h_2(x|C)$, $x \in X$.

Figure 2:
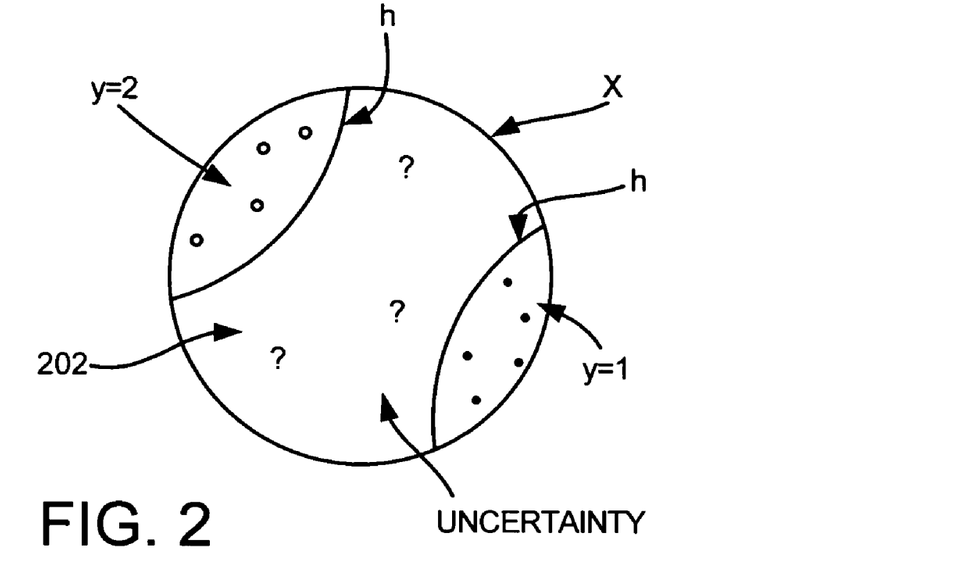
FIG. 2 is an illustration relating to uncertainty of a classifier.

Definition 1: In aspects of the present invention, uncertainty of a classifier or U(h) is defined as follows:

$$U(h)=P(\{x|h(x)=ND, x \in X\}) \qquad \text{Eq. 1}$$

where U(h) equals the probability P that classifier h reaches no decision, or "ND", or is unable to classify x instances in X. FIG. 2 is a diagram that schematically introduces the concept of uncertainty. In FIG. 2, the instances indicated at 202 are indicative or associated with the uncertainty of h or U(h) because classifier h has reached no decision regarding these instances. Classifier h assigns instances to classes or labels in the data space, such as illustrated by circles (y=2) or dots (y=1). In aspects of the present invention, U(h) comprises probability information that a classifier reaches no decision for some instances x in set X. Consequently, classifier h can be viewed as having selected or identified some instances as "uncertain." The meaning and utility of these uncertain instances will be described in greater detail below. In another embodiment, U(h) is defined as follows:

$$U(h)=P(\{x|C(h(x)=y)<\theta, \forall y \in Y, x \in X\}), \qquad \text{Eq. 2}$$

wherein θ denotes a predetermined or selected threshold where no decision is assumed and C denotes a confidence score of classifier h.

Definition 2: The conditional uncertainty U(h|y) of a classifier h given a class y is defined as follows:

$$U(h|y)=P(\{x|h(x)=ND, x \in X\}|Y=y). \qquad \text{Eq. 3}$$

The uncertainty or conditional uncertainty of a classifier or one or more functions or partial functions is an indicator of the accuracy of the classifier. For example, consider an ideal case where a classifier achieves 100% accuracy when it is able to make a classification decision and 50% accuracy when it reaches no decision. Also, assume that there are only two classes. Then the total accuracy on the entire data space is equal to 1−0.5(U(h)).

Figure 3:
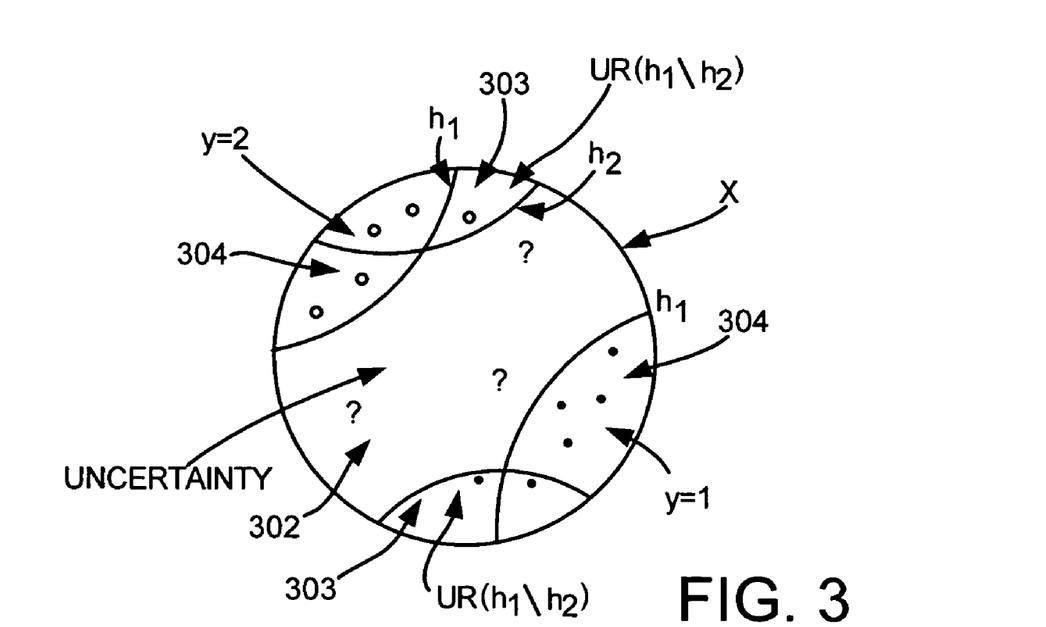
FIG. 3 is an illustration relating to uncertainty reduction between two classifiers.

Uncertainty reduction has been discovered to be an important factor for determining the performance of collaborative bootstrapping. FIG. 3 schematically illustrates the concept of uncertainty reduction between two classifiers. Classifier $h_1$ classifies instances indicated at 304 in X and reaches no decision for instances indicated at 302.

Definition 3: Given two classifiers, $h_1$ and $h_2$: In collaborative bootstrapping, the uncertainty reduction of $h_1$ with respect to $h_2$ is denoted as UR($h_1 \backslash h_2$) and is given as follows:

$$UR(h_1 \backslash h_2)=P(\{x|h_1(x)=ND, h_2(x) \neq ND, x \in X\}). \qquad \text{Eq. 4}$$

In FIG. 3, the instances indicated at 303 are indicative of UR($h_1 \backslash h_2$). Similarly, the uncertainty of $h_2$ with respect to $h_1$ is given by the following:

$$UR(h_2 \backslash h_1)=P(\{x|h_1(x) \neq ND, h_2(x)=ND, x \in X\}) \qquad \text{Eq. 5}$$

In collaborative bootstrapping, the more the uncertainty of one classifier can be reduced by the other classifier, the higher the performance can be achieved, which results in more effective collaboration.

Aspects of the present invention include a measure of uncertainty reduction for collaborative bootstrapping, referred to herein as uncertainty correlation coefficient or "UCC."

Definition 4: Given the two classifiers $h_1$ and $h_2$, the conditional uncertainty correlation coefficient or "CUCC" between $h_1$ and $h_2$ given a class y is denoted as follows:

$$r_{h_1 h_1 y} = \frac{P(h_1(x) = ND, h_2(x) = ND \mid Y = y)}{P(h_1(x) = ND \mid Y = y) P(h_2(x) = ND \mid Y = y)}. \quad \text{Eq. 6}$$

Definition 5: The uncertainty correlation coefficient, UCC, is denoted as follows:

$$R_{h_1 h_2} = \sum_y P(y) r_{h_1 h_1 y}. \quad \text{Eq. 7}$$

The UCC represents the degree to which the uncertainties of the two classifiers are related or correlated. A relatively high value for UCC indicates a relatively large portion of instances that are uncertain for both of the classifiers. It is noted that the CUCC and UCC are symmetric measures from the perspective of either classifiers while uncertainty reduction values are asymmetric. Uncertainty reduction is measured from one classifier's perspective and is given by either $UR(h_1 \backslash h_2)$ or $UR(h_2 \backslash h_1)$.

Theorem 1 below reveals the relationship between the CUCC and UCC measures and uncertainty reduction, UR. Assume that the classifier $h_1$ can collaborate with either of the two classifiers $h_2$ and $h'_2$. The two classifiers $h_2$ and $h'_2$ have equal conditional uncertainties. The CUCC values between $h_1$ and $h'_2$ are smaller than the CUCC values between $h_1$ and $h_2$. Then, according to Theorem 1, $h_1$ should collaborate with the classifier that shares the lower CUCC value. Thus, $h_1$ should collaborate with $h'_2$ because $h'_2$ helps reduce the uncertainty $h_1$ more, thus, improving accuracy more. In other words, $h_2$ or $h'_2$ can be selected to collaborate with $h_1$ as a function of CUCC and/or UCC values.

Theorem 1: Given the two classifier pairs $(h_1, h_2)$ and $(h_1, h'_2)$: If $r_{h_1 h_2 y} \geq r_{h_1 h'_2 y}, y \in Y$ and, then $UR(h_1 \backslash h_2) \leq UR(h_1 \backslash h'_2)$.

The table below indicates the theorem 1 proof:

---

THEOREM 1 PROOF:

The uncertainty $U(h_1)$ of $h_1$ is decomposed as follows:

$$U(h_1) = \sum_y P(\{x \mid h_1(x) = ND, x \in X\} \mid Y = Y) P(Y = y)$$

$$= \sum_y P(\{x \mid h_1(x) = ND, h_2(x) = ND, x \in X\} \mid Y = y) +$$

$$P(\{x \mid h_1(x) = ND, h_2(x) \neq ND, x \in X\} \mid Y = y)) P(Y = y)$$

$$= \sum_y (r_{h_1 h_2 y} P(\{x \mid h_1(x) = ND, x \in X\} \mid Y = y) \cdot$$

$$P(x \mid h_2(x) = ND, x \in X, Y = y) +$$

$$P(\{x \mid h_1(x) = ND, h_2(x) \neq ND, x \in X\} \mid Y = y)) P(Y = y)$$

$$= \sum_y (r_{h_1 h_2 y} U(h_1 \mid y) U(h_2 \mid y) +$$

$$P(\{x \mid h_1(x) = ND, h_2(x) \neq ND, x \in X\} \mid Y = y)) P(Y = y)$$

$$= \sum_y (r_{h_1 h_2 y} U(h_1 \mid y) U(h_2 \mid y) P(Y = y) +$$

$$P(\{x \mid h_1(x) = ND, h_2(x) \neq ND, x \in X\}))$$

---

-continued

THEOREM 1 PROOF:

Thus, $$UR(h_1 \backslash h_2) = P(\{x \mid h_1(x) = ND, h_2(X) \neq ND, x \in X\})$$

$$= U(h_1) - \sum_y r_{h_1 h_2 y} U(h_1 \mid y) U(h_2 \mid y) P(Y = y).$$

Similarly, $$UR(h_1 \backslash h'_2) = U(h_1) - \sum_y r_{h_1 h'_2 y} U(h_1 \mid y) U(h'_2 \mid y) P(Y = y).$$

Given conditions, $$r_{hhy} \geq r_{hh'_A y}, y \in Y \text{ and } U(h_2 \mid y) = U(h'_2 \mid y), y \in Y$$

then, $$UR(h_1 \mid h_2) \leq UR(h_1 \backslash h'_2)$$

---

Thus, Theorem 1 reiterates that the lower the CUCC values are, the higher the performances that can be achieved with collaborative bootstrapping.

Definition 6: In co-training, the two classifiers are said to satisfy the view independence assumption if the following equations hold for any class y as is described in Blum and Mitchell (1998). Mathematically, view independence can be expressed as follows:

$$P(X_1 = x_1 \mid Y = y, X_2 = x_2) = P(X_1 = x_1 \mid Y = y) \quad \text{Eq. 8}$$

$$P(X_2 = x_2 \mid Y = y, X_1 = x_1) = P(X_2 = x_2 \mid Y = y) \quad \text{Eq. 9}$$

Theorem 2: If the view independence assumption holds, then $r_{h_1 h_2 y} = 1.0$ holds for any class y. According to Abney (2002), view independence implies classifier independence. The proof for theorem 2 is given in the table below:

---

THEOREM 2 PROOF:

$$P(h_1 = u \mid Y = y, h_2 = v) = P(h_1 = u \mid Y = y)$$
$$P(h_2 = v \mid Y = y, h_1 = u) = P(h_2 = v \mid Y = y).$$

The above equations can be rewritten as follows:

$$P(h_1 = u, h_2 = v \mid Y = y) = P(h_1 = u \mid Y = y) P(h_2 = v \mid Y = y)$$

Thus, $$P(x \mid h_1(x) = ND, h_2(x) = ND, x \in X\} \mid Y = y)$$
$$= P(\{x \mid h_1(x) = ND, x \in X\} \mid Y = y) P(\{x \mid h_2(x) = ND, x \in X\} \mid Y = y)$$

which means $$r_{h_1 h_2 y} = 1.0, \forall y \in Y.$$

---

Theorem 2 indicates that in co-training with view independence, the CUCC values $r_{h_1 h_2 y} = 1.0, \forall y \in Y$ are relatively small, since by definition $0 < r_{h_1 h_2 y} < \infty$. Also, according to Theorem 1, it is relatively easy to reduce the uncertainties of the classifiers, e.g. co-training with view independence can generally perform adequately.

Uncertainty Reduction Algorithm

In aspects of the present invention, an algorithm referred to as an uncertainty reduction method, process or algorithm is used with collaborative bootstrapping, including co-training and bilingual bootstrapping. In these aspects, the collaboration between classifiers is driven by uncertainty reduction.

Specifically, one classifier (e.g. classifier 1, a first classifier, or $h_1$) selects or identifies the most uncertain unlabeled instances for classifier 1 and asks the other classifier (e.g. classifier 2, a second classifier, or $h_2$) to label the identified uncertain instances. Uncertainty reduction of classifier 2 with respect to classifier 1 can be conducted in parallel. Thus, classifier 2 selects or identifies the most uncertain unlabeled instances for classifier 2 and asks classifier 1 to label those instances. Thus, classifier 1 and classifier 2 can collaborate more effectively with each other thereby increasing overall classifier performance.

Figure 4:
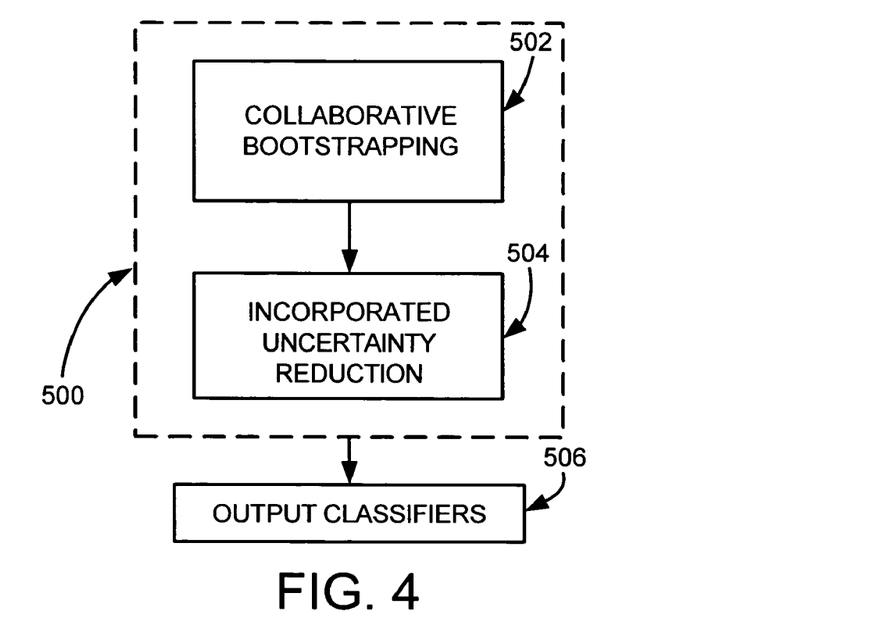
FIG. 4 is a block diagram of an embodiment of the present inventions.
Figure 5:
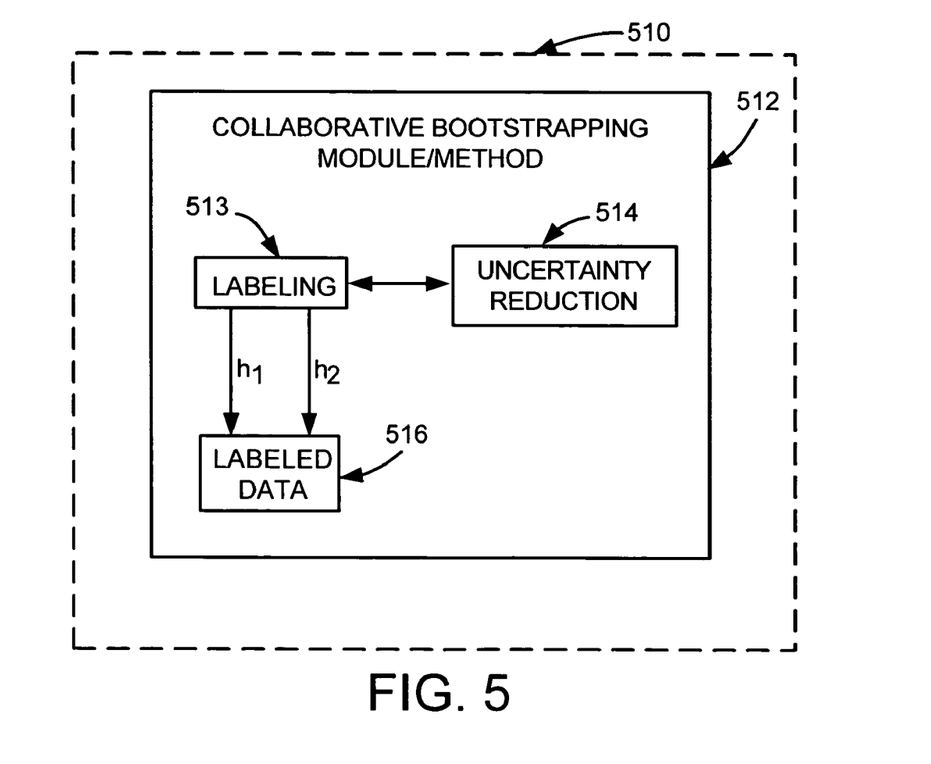
FIG. 5 is a block diagram of another embodiment of the present inventions.

FIGS. 4 and 5 illustrate embodiments of the present inventions. It is important to note that in the present methods and/or embodiments illustrated in FIGS. 4-7 and described in corresponding written description, the steps and/or modules are illustrative only, and therefore, can be reordered, combined, re-combined, and/or divided as desired or necessary for a particular application. Collaborative bootstrapping as indicated at 502 is a co-training and/or bootstrapping method and/or module, such as described in Blum and Mitchell (1998), Nigam and Ghani (2000) and Li and Li (2002). However, it is important to note that other new or existing methods and/or modules that use labeled and unlabeled data for iterative classifier training can be indicated by 502. Collaborative bootstrapping method and/or module 502 is conventional in that it does not include selecting uncertain data with respect to one classifier for another classifier to label, as in the present inventions.

Uncertainty reduction 504 is incorporated to collaborative bootstrapping 502 in order to increase classifier performance and accuracy. Collaborative bootstrapping 502 with incorporated uncertainty reduction 504 as described herein generate or output classifiers as indicated at 506. As illustrated in FIG. 5, in some embodiments, classifying or labeling 513 of unlabeled data can be incorporated with uncertainty reduction 514 within a collaborative bootstrapping module, method, or algorithm 512, such as with a step or steps, routine, subroutine, module, sub-module, and the like. As illustrated in FIG. 5, classifier $h_1$ is capable of labeling or assigning data to classes. Classifier or collaborator $h_2$ is capable of labeling unlabeled data that $h_1$ identified as uncertain or most uncertain with respect to $h_1$. In this way, the uncertainty of $h_1$ can be reduced by collaborator $h_2$. Similarly, $h_1$ can also collaborate with $h_2$ to reduce the uncertainty of $h_2$ with respect to $h_1$.

Other embodiments include data classification systems 500, 510 illustrated as dotted lines in FIGS. 4 and 5 that can include one or more computer-readable media with executable instructions and/or methods that use co-training, bootstrapping or collaborative bootstrapping with incorporated uncertainty reduction 504, 514 as described herein.

Figure 6:
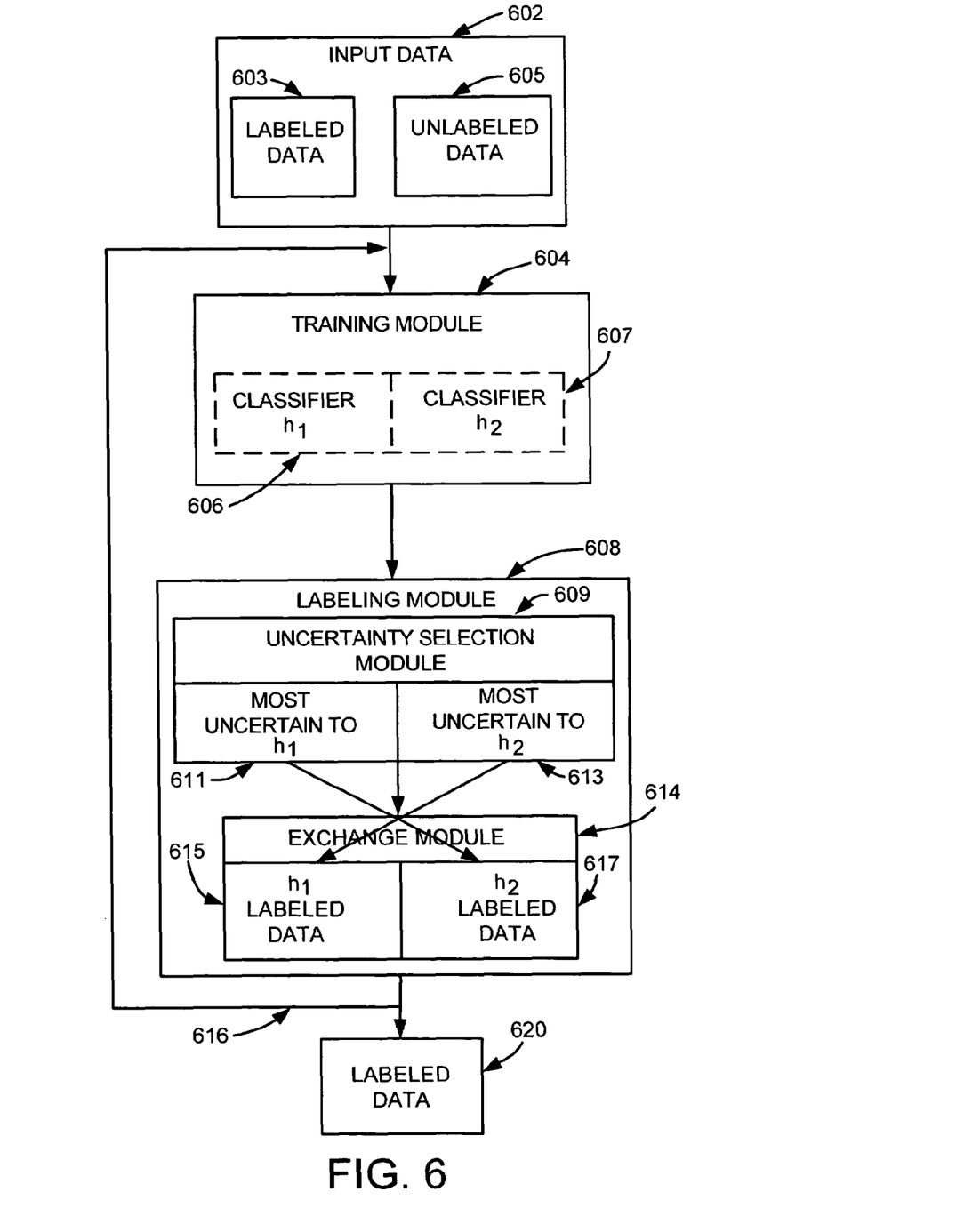
FIG. 6 is a block diagram illustrating an embodiment for training a classifier.

FIG. 6 and the table below illustrate iterative classifier training with uncertainty reduction. At initialization, training module 604 receives input data 602 from any of the input devices described above or any of the storage devices described above. Input data 602 includes labeled data 603 and unlabeled data 605. In some embodiments, labeled data is a relatively small data set in order to limit costs associated with human labeling of data. Unlabeled data can include unprocessed data that can be received or obtained from web sources, publications, newspapers, and the like. In some embodiments, unlabeled data can also include pre-processed data such as sentences having ambiguous words to be disambiguated.

Initially, training module 604 creates, constructs or builds classifier $h_1$ as indicated at 606 and $h_2$ as indicated at 607 using labeled data 603. Classifiers $h_1$ and $h_2$ label at least some or portions of unlabeled data 605 in labeling module 608. Labeling module 608 includes uncertainty selection module 609 where classifier $h_1$ identifies or selects $B_y$ instances as indicated at 611 based on or as a function of probabilities or uncertainty such as to classifier $h_1$. The $B_y$ instances 611 are selected based on probability information, which can include probability or likelihood that $h_1$ reaches no decision or is unable to classify $B_y$ instances or data 611. In other words, values of uncertainty are calculated for unlabeled data to determine a set of instances 611 that is relatively or most uncertain to $h_1$. These $B_y$ instances 611 in the identified or selected set can be selected using equations 1 and 2 above.

Similarly, in uncertainty selection module 609, classifier $h_2$ identifies and selects $B_y$ instances indicated at 613 based on or as a function of uncertainty such as to classifier $h_2$. The $B_y$ instances 613 are selected as a function of uncertainty in the same way as classifier $h_1$. For example, in some embodiments, $B_y$ instances 611, 613 are selected using equation 2 where instances 611, 613 having probabilities relative to a predetermined threshold θ are selected as "most uncertain" to a particular classifier. In some embodiments, instances 611, 613 having values of uncertainty below the predetermined threshold are selected or identified as "most uncertain" to either $h_1$ or $h_2$.

In some embodiments, in uncertainty selection module 609, classifier $h_1$ selects $A_y$ unlabeled instances (not shown) that are certain or most certain to $h_1$ and then $B_y$ 613 instances are selected from the $A_y$ instances, where $A_y > B$. Similarly and in parallel, classifier $h_2$ selects $A_y$ instances that are certain with respect to $h_2$ and then $B_y$ 611 instances are selected from these $A_y$ instances. The instances 611 are received by exchange module 614 and labeled using classifier $h_2$ to form a set of labeled data 617. Similarly, instances 613 are labeled using classifier $h_1$ to form a set of labeled data 615. The labeled data 615, 617 are then added to labeled data or data set 620 to augment data set 620. The process is iterative, e.g. for each class $y \in Y$, as indicated at 616. Generally, classifiers $h_1$ and $h_2$ can be rebuilt or re-constructed in training module 604 using augmented data set 620 having newly labeled data 615, 617 for each iteration or loop until no unlabeled data 605 remains to be labeled or classified.

In this way, two parallel processes are conducted where classifiers each identify uncertain unlabeled data with respect to itself and ask the other classifier to label the identified data. It is believed that reducing uncertainty in this manner using two or more classifiers that exchange information as described herein can increase classifier accuracy. Further, in some embodiments, for each class y, classifier $h_1$ first selects its certain or most certain $A_y$ instances, classifier $h_2$ next selects from them its uncertain $B_y$ instances where $A_y \geq B_y$. Finally, classifier $h_1$ labels the $B_y$ instances. Collaboration in the opposite direction is performed similarly and in parallel.

TABLE

| Algorithm |
| --- |
| Input A set of labeled set L and an unlabeled set U.<br>    Create classifier $h_1$ using set L.<br>    Create classifier $h_2$ using set L.<br>For each class (Y = y) perform the following:<br>    Select or identify $B_y$ unlabeled instances whose labels are certain for $h_1$ and uncertain for $h_2$; and label the selected instances with $h_1$. Add these labeled instances to a labeled set.<br>    Select or identify $B_y$ unlabeled instances whose labels are certain for $h_2$ and uncertain for $h_1$; and label the selected instances with $h_2$. Add these labeled instances to a labeled set.<br>    Output classifiers $h_1$ and $h_2$ |

Figure 7:
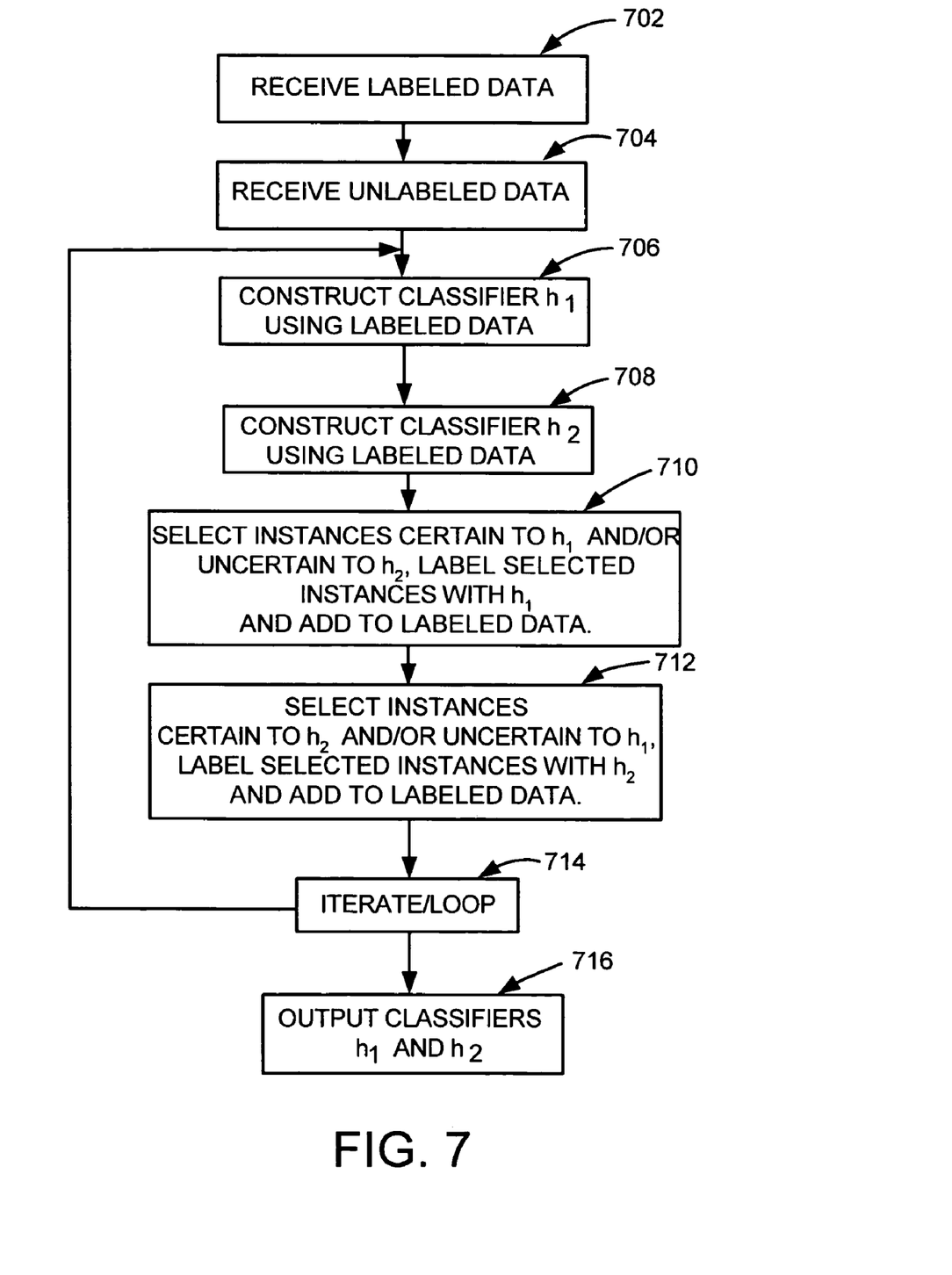
FIG. 7 is a block diagram illustrating a method of the present inventions.

FIG. 7 illustrates a method of the present inventions described above. At step 702, labeled data or a labeled data set is received or obtained. At step 704, unlabeled data or an unlabeled data set is received or obtained. At step 706, classifier $h_1$ is created, built, or constructed using received labeled data. At step 708, classifier $h_2$ is created, built, or constructed using received labeled data. At step 710, for each class, instances that are certain to classifier $h_1$ and/or instances that are uncertain to classifier $h_2$ are selected or identified. The selected instances are labeled or assigned to classes by classifier $h_1$, which can be added to the labeled data. At step 712, instances in the unlabeled data that are certain to classifier $h_2$ and/or instances that are uncertain to classifier $h_1$ are selected or identified. The selected instances are labeled or assigned to classes by classifier $h_2$. The labeled instances can then be added to the labeled data. At step 714, the method iterates or loops for some or all of the classes. At step 716, classifiers $h_1$ and $h_2$ are output or generated.

Experiments were conducted to empirically evaluate the UCC values of collaborative bootstrapping. The relationship between UCC and accuracy was also evaluated to determine whether to theoretical analysis underlying aspects of the present inventions was reasonable. In the experiments, accuracy was defined as the percentage of instances whose assigned labels agree with their true or verified labels. Moreover, UCC refers to the UCC value on the test data. The predetermined or selected value of □ in Equation 2 was set at 0.8.

The data indicated in publication Nigam and Ghani (2000) was used to conduct aspects of the present invention. The data included articles from four newsgroups in the following table. Each group had 1000 texts.

TABLE

Artificial Data from Nigam and Ghani (2000)

| Class | Feature Set A | Feature Set B |
|---|---|---|
| Pos | Comp.os.ms-windows.misc | talk.politics.misc |
| Neg | Comp.sys.ibm.pc.hardware | talk.politics.guns |

Two-class classification data with view independence was created by joining together randomly selected texts from each of the two newsgroups in the first row as positive instances and joining together randomly selected texts from each of the two newsgroups in the second row as negative instances. As a result of the joining, the words in the two newsgroups in the first column came from one vocabulary, while the words in the newsgroups in the second column came from the other vocabulary. A set of classification data without view independence was also created by randomly splitting all the features of the pseudo texts into two subsets such that each of the subsets contained half of the features.

Both the old co-training algorithm of Nigam and Ghani (2000) and an algorithm including aspects of the present invention were then applied to the two data sets. The same pre-processing described in Nigam and Ghani (2000) was conducted in the two experiments. The header and stop words of each text were removed from each text. Each text had the same length. Eighteen texts from the entire 2000 texts were discarded because their contents included binary codes, encoding errors and the like.

The data was randomly separated. Co-training was performed with random feature split and with natural feature split over five trials. The data presented in the table below were averaged over the five trials. In each trial, three texts for each class were used as labeled training instances, 976 texts as testing instances, and the remaining 1000 texts as unlabeled training instances.

The results indicated in the table below indicated that the UCC value of the natural split (in which view independence holds) is lower than that of the random split (in which view independence does not hold). In other words, in natural split there are fewer instances that are uncertain for both of the classifiers. Therefore, the accuracy of the natural split is higher than that of the random split. Theorem 1 states that the lower the CUCC values are, the higher the performances that can be achieved. The results in table below thus agreed with Theorem 1. Also, the UCC value of the natural split having view independence is about 1.0, which agrees with Theorem 2. (It is noted that CUCC is useful in for theoretical analysis, but it is generally easier to use UCC for empirical analysis.)

TABLE

Results for Artificial Data

| Feature | Accuracy | UCC |
|---|---|---|
| Natural Split | 0.928 | 1.006 |
| Random Split | 0.712 | 2.399 |

Co-Training for Web Page Classification

Co-training for web page classification was performed on the same data in presented in Blum and Mitchell (1998). The web page data consisted of 1051 web pages collected from the computer science departments of four universities. The goal of classification was to determine whether a web page was concerned with an academic course. Twenty-two percent of the pages were actually related to academic courses. The features for each page were separated into two independent parts. One part consisted of words occurring in a current page and the other part consisted of words occurring in anchor texts directed to a current page.

The data was randomly split the data into three subsets: a labeled training set, unlabeled training set, and test set. The labeled training set had three course pages and nine non-course pages. The test set had 25% of the pages. The unlabeled training set had the remaining data. The data was used to perform co-training and web page classification. The results presented in the table below were evaluated in terms of UCC and accuracy and averaged over the five trials.

TABLE

Results for Web Page Classification

| Data | Accuracy | UCC |
|---|---|---|
| Web Page | 0.943 | 1.147 |

Bilingual Bootstrapping

Bilingual bootstrapping and word translation disambiguation was conducted on the same data presented in Li and Li (2002). The word translation disambiguation data were related to seven ambiguous English words: "bass", "drug", "duty", "palm", "plant", and "space," each having two possible Chinese translations. The goal of disambiguation was to determine the correct Chinese translations of the ambiguous English words, given English sentences containing the ambiguous words.

For each word, there were two seed words used to select labeled instances for training, a large number of unlabeled instances or sentences in both English and Chinese for training, and about 200 labeled instances or sentences for testing. Details on data are shown in the table below.

TABLE

Test Data for Bilingual Bootstrapping

| Word | Unlabelled instances English | Unlabelled instances Chinese | Seed words | Test instances |
|---|---|---|---|---|
| Bass | 142 | 8811 | Fish/music | 200 |
| Drug | 3053 | 5398 | treatment/smuggler | 197 |
| Duty | 1428 | 4338 | discharge/export | 197 |
| Palm | 366 | 465 | tree/hand | 197 |
| Plant | 7542 | 24977 | industry/life | 197 |
| Space | 3897 | 14178 | volume/outer | 197 |
| Tank | 417 | 1400 | combat/fuel | 199 |
| Total | 16845 | 59567 | — | 1384 |

The data was used to perform bilingual bootstrapping and word sense disambiguation. The settings for the experiment was similar to those presented in Li and Li (2002). The table below presents results for accuracy and UCC value for each word.

The results for both co-training and bilingual bootstrapping indicate relatively low UCC values (approximately 1.0). Lower UCC (and CUCC) values correlate or predict higher accuracy performances according to Theorem 1. In sum, test results indicate that methods of the present invention yield relatively high accuracies. Generally, the methods of the present invention were particularly useful in situations where view independence didn't hold and about the same in situations where view independence holds, e.g. Blum and Mitchell (1998).

TABLE

Results for Bilingual Bootstrapping

| Data | | Accuracy | UCC |
|---|---|---|---|
| Word Sense Dis-Amiguation | bass | 0.925 | 2.648 |
| | drug | 0.868 | 0.986 |
| | duty | 0.751 | 0.840 |
| | palm | 0.924 | 1.174 |
| | plant | 0.959 | 1.226 |
| | space | 0.878 | 1.007 |
| | tank | 0.844 | 1.177 |

Co-training for News Article Classification

A data set from two newsgroups (comp.graphics and comp.os.ms-windows.misc) presented in Joachims (1997) was constructed and used to conduct co-training and text classification. There were 1000 texts for each group. The former group was viewed as a positive class and the latter group as the negative class. An existing algorithm without uncertainty reduction and an algorithm with uncertainty reduction as described in the present embodiments was applied to the data set. In the experiment, 20 trials were conducted. In each trial, the data was randomly split into labeled training data, unlabeled training data, and test data sets. Three texts per class were used as labeled instances for training, 994 texts for testing, and the remaining 1000 texts as unlabeled instances for training. The experiment used the same pre-processing as presented in Nigram and Ghani (2000).

The results for the 20 trials are presented in the table below. Accuracies were averaged over five trials. The table below indicates that co-training with the algorithm having incorporated uncertainty reduction outperforms algorithms without uncertainty reduction and also single bootstrapping. "Single bootstrapping" refers to conventional bootstrapping where a single classifier repeatedly boots its performance with all the features.

TABLE

Results for News Article Classification

| Average accuracy | Single Bootstrapping | Collaborative Bootstrapping (old) | Collaborative Bootstrapping (new) |
|---|---|---|---|
| Trial 1-5 | 0.725 | 0.737 | 0.768 |
| Trial 6-10 | 0.708 | 0.702 | 0.793 |
| Trial 11-15 | 0.679 | 0.647 | 0.769 |
| Trial 16-20 | 0.699 | 0.689 | 0.767 |
| All | 0.703 | 0.694 | 0.774 |

The results presented above indicate that the co-training or bootstrapping methods or algorithms with uncertainty reduction or new collaborative bootstrapping as described herein result in better performance or accuracy, especially when collaboration is relatively difficult and about as well when collaboration is relatively easy. In addition to collaborative bootstrapping, the algorithm of the present invention can be applied into single bootstrapping problems, especially by randomly splitting the feature sets and using co-training with uncertainty reduction on the split subsets.

Although the present invention has been described with reference to particular embodiments, workers skilled in the art will recognize that changes may be made in form and detail without departing from the spirit and scope of the invention.

What is claimed is:

1. A computer readable storage medium including instructions readable by a computer, which when implemented, cause the computer to classify data comprising the steps of:
   receiving labeled data;
   receiving unlabeled data;
   constructing a first classifier and a second classifier using the labeled data;
   performing uncertainty reduction comprising:
     selecting instances from the unlabeled data that are uncertain with respect to the first classifier; and
     selecting instances from the unlabeled data that are uncertain with respect to the second classifier;
   labeling the instances uncertain to the first classifier using the second classifier to form a first labeled set;
   labeling the instances uncertain to the second classifier using the first classifier to form a second labeled set;
   re-constructing the first classifier and the second classifier using the first labeled set and the second labeled set;
   providing the re-constructed first classifier and the re-constructed second classifier for use in labeling data;
   wherein selecting instances uncertain to the first classifier includes selecting instances of the unlabeled data as a function of uncertainty;
   wherein selecting instances of the unlabeled data as a function of uncertainty comprises calculating at least one value of uncertainty used to select the instances uncertain to the first classifier;

wherein selecting instances uncertain to the first classifier includes selecting instances having a value of uncertainty that is compared to a predetermined threshold; and wherein selecting instances having a value of uncertainly includes selecting instances having a value of uncertainty below the predetermined threshold.

2. The computer readable storage medium of claim 1, wherein receiving labeled data includes receiving data assigned to classes and wherein receiving unlabeled data includes receiving data capable of being assigned to classes.

3. The computer readable storage medium of claim 2, and further comprising reconstructing the first and second classifiers using at least the first labeled set.

4. The computer readable storage medium of claim 1, wherein selecting instances as a function of uncertainty includes calculating probabilities.

5. The computer readable storage medium of claim 4, wherein calculating probabilities includes calculating probabilities that the first classifier is unable to label some instances of the unlabeled data.

6. The computer readable storage medium of claim 1, and further comprising exchanging information between the first labeled and the second labeled set to form at least one shared set.

7. The computer readable storage medium of claim 6, and further comprising reconstructing the first and second classifiers using the at least one shared set.

8. The computer readable storage medium of claim 1, wherein labeling the instances uncertain to the first classifier includes assigning instances in the first labeled set to a first set of classes, and wherein labeling the instances uncertain to the second classifier includes assigning instances in the second labeled set to a second set of classes.

9. The computer readable storage medium of claim 8, wherein the first set of classes and the second set of classes are the same.

10. The computer readable storage medium of claim 8, wherein the first set of classes and the second set of classes are different.

11. The computer readable storage medium of claim 8, wherein the first set of classes and the second set of classes are mutually exclusive.

12. The computer readable storage medium of claim 8, wherein the first set of classes and the second set of classes overlap by having classes in common.

13. The computer readable storage medium of claim 1, and further comprising selecting unlabeled data that is certain with respect to the first classifier.

14. The computer readable storage medium of claim 13, wherein selecting certain unlabeled data includes selecting the most certain unlabeled data with respect to the first classifier.

15. The computer readable storage medium of claim 13, wherein selecting instances uncertain to the first classifier includes selecting data in the certain data.

16. The computer readable storage medium of claim 13, wherein selecting instances uncertain to the first classifier includes selecting data not in the certain unlabeled data.

* * * * *